Oct. 24, 1939. W. K. HENNING Re. 21,247

SOCKET

Original Filed Feb. 13, 1935

Inventor:
Warren K. Henning
By: Jones, Addington, Ames & Seibold
Attys.

Reissued Oct. 24, 1939

Re. 21,247

UNITED STATES PATENT OFFICE 21,247

SOCKET

Warren K. Henning, Plano, Ill., assignor to Hugh H. Eby Inc., Philadelphia, Pa.

Original No. 2,088,322, dated July 27, 1937, Serial No. 6,287, February 13, 1935. Application for reissue July 13, 1939, Serial No. 284,381

11 Claims. (Cl. 173—339)

My invention relates to sockets for vacuum tubes.

In securing vacuum tube sockets to the mounting panel, it has been customary to rivet a portion of the insulating base of the socket to the panel. In this method, it often happened that the riveting operation would crush or injure the insulating base part, thus rendering the entire socket useless.

One of the objects of my invention is to provide an improved mounting for a vacuum tube socket which will obviate the difficulty pointed out above.

A further object of my invention is to provide a securing member for holding the socket on the panel which also serves to hold the two parts of the socket base together.

A further object of my invention is to provide such a construction in which the socket base may be mounted in various positions of rotary adjustment with respect to the holder member.

A further object of my invention is to provide an improved contact for engaging the contact pin on the tube which will give good electrical contact and which will be inexpensive to manufacture and assemble.

Further objects will be apparent from the specification and claims.

In the drawing, in which an embodiment of my invention is shown,

Figure 1:
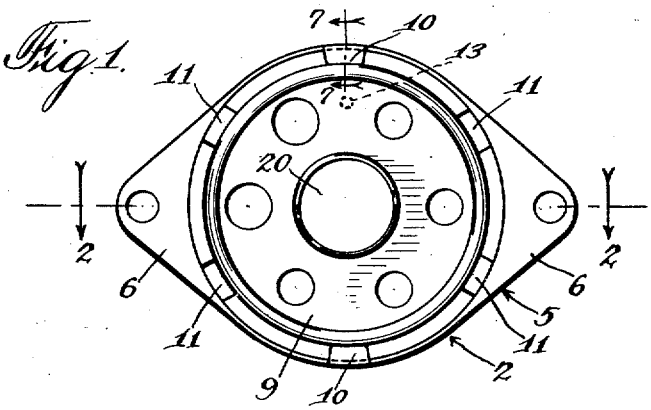
Figure 1 is a front view of a vacuum tube socket construction embodying my invention.

Referring to the drawing in detail, the construction shown comprises a panel 1 having an opening therein to receive a portion of the socket and a socket 2 secured in position on said panel by means of eyelets, rivets 3, or the like. The socket itself comprises a two-part insulating base, a plurality of contacts 4 mounted thereon for engaging the contact pins on the vacuum tube, and means for holding the two parts of the base together and securing the base to the panel comprising a sheet metal ring member 5 surrounding the peripheral edges of the base parts and having laterally extending wings or ears 6 through which the securing eyelets 3 extend, which secure the socket to the panel. This ring member may be of sheet metal and is provided with an inwardly-extending annular flange 7 against which an annular shoulder on the inner base part 8 rests. The outer base part 9 is held securely in position in the ring by means of a pair of fingers or lugs 10 bent down into correspondingly shaped recesses 11 in the rim of the outer base part 9. The outer base part is shown as provided with six of these recesses so that the two-part base may be secured in the ring in any one of six positions of rotary adjustment. This is of great convenience to the manufacturer, in that it enables him to bring the wiring terminals on the socket contacts into the desired position for wiring.

The use of the sheet metal ears 6 for securing the socket to the panel avoids the necessity for riveting through some insulating portion of the socket, thus eliminating this cause of breakage of the sockets. The two insulating base parts are centered with respect to each other by means of a flange portion 12 on the outer base part fitting over an annular shoulder of the inner base part. The base parts are positioned with respect to each other so that the openings on the outer base part will line up properly with respect to the openings on the inner base part by means of a lug or boss 13 on the outer base part which fits into a correspondingly shaped recess on the inner base part 8.

Figure 5:
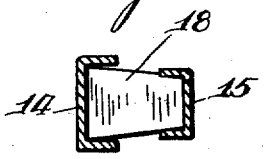
Fig. 5 is a section on the line 5—5 of Fig. 2.
Figure 6:
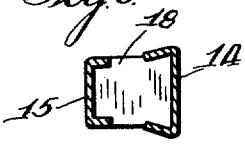
Fig. 6 is a section on the line 6—6 of Fig. 2.

As the contact pins on a vacuum tube are of different diameters, it is necessary that the contacts on the socket and the openings in the insulating base leading to these contacts should be correspondingly different in size in order to insure the proper engagement of the pins on the vacuum tubes with the contacts on the socket. With this in mind, the contact 4, shown in perspective in Fig. 4, has been designed. This contact is so designed that the same blank may be used for making the contacts both for the large diameter of contact pins and for the small diameter contact pins. The contact is made from a single blank of sheet metal shaped to provide two sheet metal contact members 14 and 15 between which the contact pin extends, these contact members being trough-shaped in cross section so that the cut edges of the trough have yielding line contact with the contact pins. As shown in Figs. 4, 5 and 6, one of these trough-like contact members 14 is wider than the other which insures proper positioning of the contact when inserted into the correspondingly-shaped openings in the lower insulating base portions, as shown in Fig. 3.

Figure 2:
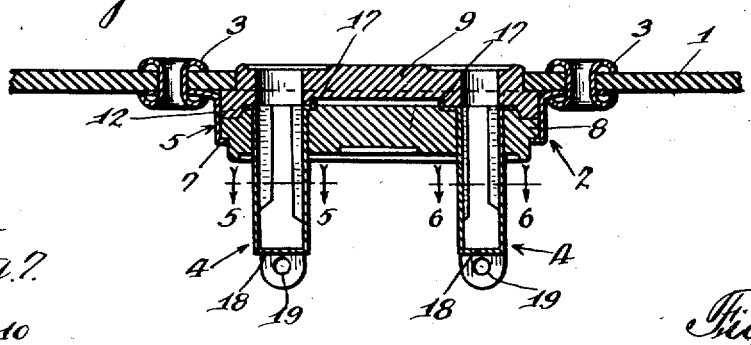
Fig. 2 is a section on the line 2—2 of Fig. 1, but showing the socket secured to a panel.
Figure 7:
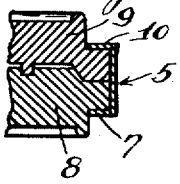
Fig. 7 is a section on the line 7—7 of Fig. 1.
Figure 3:
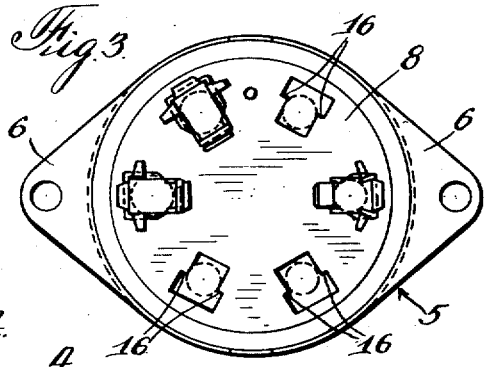
Fig. 3 is a view of the socket with the outer insulating cover portion removed.
Figure 4:
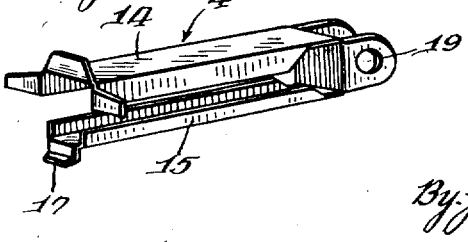
Fig. 4 is a perspective view of one of the contacts.

As shown in Fig. 3, the larger trough portion fits in the larger portion of the opening in the insulating base, the cut edges of the larger trough-like portion engaging the shoulders 16 on the openings in the base. This holds the larger trough-like portion in proper position on the base. In order to prevent the smaller trough-like portion from shifting over toward the larger trough-like portion, a lug or finger 17 is provided on the smaller trough-like portion which engages an annular shoulder on the outer insulating base portion, as shown in Fig. 2. The two trough-like portions are united at their lower ends by means of a portion 18 of the stamping, and soldering terminals are provided as integral parts of the stamping, having openings 19 through which wires may be inserted for soldering. As stated above, the contact for engagement with the large diameter pin is made from the same blank as the contact for the smaller diameter pin. The only difference in the complete contacts is that the sides of the larger trough-like contact member 14 are bent inwardly toward each other, more for the small diameter pin than for the large diameter pin, the cross-section of the contact for the small diameter pin being shown in Fig. 6 and the cross-section for the large diameter pin being shown in Fig. 5.

It will be seen that the use of the ring member 5 for holding the two parts of the insulating base together avoids the necessity for a central securing member, thus leaving the outer central portion 20 of the outer insulating base portion clear and unobstructed so that an identifying member or character may be molded on this central portion. It will also be seen that the use of ths sheet metal cup-like member for holding the two parts of the plates together and for securing the socket to the panel avoids the necessity for riveting through an insulating part, thus eliminating this source of breakage. It will be seen that the contacts are so designed that they afford a desirable engagement with the contact pins on the tube by means of the four cut edges, that the contacts for the different sizes of pin may be made from the same blank and that means are provided for holding the contacts firmly in desired position on the insulating base.

Further modifications will be apparent to those skilled in the art and it is desired, therefore, that the invention be limited only by the prior art and the scope of the appended claims.

Having thus described my invention, what I claim and desire to secure by Letters Patent is:

1. A panel and socket construction for vacuum tubes comprising a panel having an opening therein and a socket secured to said panel in line with said opening, said socket comprising a two-part insulating base, the rear portion of the base carrying contacts for engagement with the tube contacts and the front portion of the base having openings therein affording access to the tube engaging contacts, said tube engaging contacts having portions clamped between said base portions, the front portion of the base having a portion fitting in said opening and an annular shoulder fitting against the rear side of the panel around said opening, said annular shoulder having a recess therein providing a clearance space in the rear of the panel, and means for securing the two parts of the base together and securing the base to the panel comprising a sheet metal ring member surrounding the peripheral edges of the base portions and having outwardly and laterally extending portions secured to the panel and having an inwardly extending portion entering said recess and lying in the said clearance space whereby the two parts of the base may be held together and whereby the shoulder may fit snugly against the panel.

2. A socket construction for vacuum tubes comprising an insulating base having openings therethrough for the entrance of the tube contacts, contacts mounted on said base for engaging the tube contacts, said base having a peripheral annular portion having a rear annular shoulder and a socket holder for supporting said base and securing it to a panel comprising an integral sheet metal ring member having a cylindrical portion surrounding said peripheral annular portion, an integral annular flange extending inwardly from said cylindrical portion for engaging the rear shoulder of the base, integral ears extending outwardly and laterally from the front edge of the cylindrical portion having openings therethrough to enable the socket to be secured to the panel, and an integral finger spaced circumferentially with respect to said ears extending inwardly from the front edge of the cylindrical portion, the annular peripheral portion on the base being embraced and held between said finger and said inwardly extending flange.

3. A socket construction for vacuum tubes comprising an insulating base having openings therethrough for the entrance of the tube contacts, contacts mounted on said base for engaging the tube contacts, said base having a peripheral annular portion having a rear annular shoulder and a socket holder for supporting said base and securing it to a panel comprising an integral sheet metal ring member having a cylindrical portion surrounding said peripheral annular portion, an integral annular flange extending inwardly from said cylindrical portion for engaging the rear shoulder of the base, integral ears extending outwardly and laterally from the front edge of the cylindrical portion having openings therethrough to enable the socket to be secured to the panel, and an integral finger spaced circumferentially with respect to said ears extending inwardly from the front edge of the cylindrical portion, the annular peripheral portion on the base being embraced and held between said finger and said inwardly extending flange, the annular peripheral portion on the base having a recess in its front face to receive said finger to enable said front face to fit snugly against the panel and to position the base in the holder.

4. A socket construction for vacuum tubes comprising an insulating base having openings therethrough for the entrance of the tube contacts, contacts mounted on said base for engaging the tube contacts, said base having a peripheral annular portion having a rear annular shoulder and a socket holder for supporting said base and securing it to a panel comprising an integral sheet metal ring member having a cylindrical portion surrounding said peripheral annular portion, an integral annular flange extending inwardly from said cylindrical portion for engaging the rear shoulder of the base, integral ears extending outwardly and laterally from the front edge of the cylindrical portion having openings therethrough to enable the socket to be secured to the panel, and an integral finger spaced circumferentially with respect to said ears extending inwardly from the front edge of the cylindrical portion, the annular peripheral portion on the base being embraced and held between said finger and said inwardly extending flange, the annular peripheral portion on the base having a plurality of recesses in its front face in any one of which said finger may be received to enable the front face of the flange to fit snugly against the panel and to enable the base to be held in any one of a number of adjusted positions in the holder.

5. A socket construction for vacuum tubes comprising a two-part insulating base, the rear portion of the base carrying contacts for engagement with the tube contacts and the front portion of the base having openings therein affording access to the tube-engaging contacts, said tube-engaging contacts having portions clamped between said base portions, said base having a peripheral annular portion having a rear annular shoulder and a socket holder for supporting said base and securing it to a panel comprising an integral sheet metal ring member having a cylindrical portion surrounding said peripheral annular portion, an integral annular flange extending inwardly from said cylindrical portion for engaging the rear shoulder of the base, integral ears extending outwardly and laterally from the front edge of the cylindrical portion having openings therethrough to enable the socket to be secured to the panel, and an integral finger spaced circumferentially with respect to said ears extending inwardly from the front edge of the cylindrical portion, the annular peripheral portion on the base being embraced and held between said finger and said inwardly extending flange.

6. A panel and socket construction for vacuum tubes comprising a panel having an opening therein and a socket secured to said panel in line with said opening, said socket comprising an insulating base having prong openings, contacts mounted in the base in alignment with the respective prong openings for engagement by the tube contacts, the base having a portion registering with said opening and an anular surface fitting against the rear side of the panel around said opening, said annular surface having a recess therein providing a clearance space in the rear of the panel, and means for securing the base against axial movement in one direction and securing the base to the panel comprising a sheet metal ring member surrounding the peripheral edges of the base portions and having outwardly and laterally extending portions secured to the panel and having an inwardly extending portion entering said recess and lying in the said clearance space whereby the base is held against angular movement and against axial movement in the other direction and whereby the annular surface may fit snugly against the panel.

7. A socket construction for vacuum tubes comprising an insulating base having openings therethrough for the entrance of tube contacts, contacts mounted on said base for engaging the tube contacts, said base having a peripheral annular portion having a rear annular shoulder and a socket holder for supporting said base and securing it to a panel comprising an integral sheet metal ring member having a cylindrical portion surrounding said peripheral annular portion, an integral annular flange extending inwardly from said cylindrical portion for engaging the rear shoulder of the base, integral ears extending outwardly and laterally from the front edge of the cylindrical portion having openings therethrough to enable the socket to be secured to the panel, and an integral finger extending inwardly from the front edge of the cylindrical portion, the annular peripheral portion on the base being embraced and held between said finger and said inwardly extending flange.

8. A socket construction for vacuum tubes comprising an insulating base having openings therethrough for the entrance of tube contacts, contacts mounted on said base for engaging the tube contacts, and means for securing the base to a supporting panel comprising a cupped sheet metal ring member surrounding the peripheral edge of said base and having laterally extending portions to be secured to the panel, said ring member having an inwardly extending relatively short flange for supporting the base, said flange having a socket receiving aperture, and said ring member having an integral bendable finger extending inwardly from a point axially spaced from the flange to overlie the base substantially in the plane of the laterally extending portions to hold same against the flange.

9. A socket construction for vacuum tubes comprising an insulating base having openings therethrough for the reception of the prongs of a vacuum tube, contacts mounted on said base for engaging the tube contacts, said base having respectively upwardly presenting and downwardly presenting surfaces, contacts mounted on the base, a sheet metal stamping having a portion for anchoring engagement with a panel, said stamping including an unbroken base-enclosing wall, an integral flange element extending inwardly from one end of the wall in a position to be engaged by the downwardly presenting surface of the said base, a finger formed integrally with the stamping at the other end of the wall and bendable inwardly to engage the said upwardly presenting surface of the base to form with the flange and the wall means locking the base against axial or lateral motion relative to the stamping.

10. A socket construction for vacuum tubes comprising an insulating base having openings therethrough for the reception of the prongs of a vacuum tube, contacts mounted on said base for engaging the tube contacts, said base formed of upper and lower members in assembly having respectively upwardly presenting and downwardly presenting surfaces on the respective members, contacts mounted on the base, a sheet metal stamping having an unbroken base-enclosing wall, an integral flange formed at the lower end of the wall in a position to be engaged by the downwardly presenting surface of the base, an integral anchoring portion formed at the other end of the said wall, a finger formed integrally with the stamping at the said other end of said wall and bendable inwardly spaced substantially parallel relation to the said flange to engage the said upwardly presenting surface of the base to form with the flange and the wall means locking the base, and stamping together against relative axial or lateral movement as well as locking the base member axially in assembly.

11. As a new article of manufacture a mounting for a socket for plug-in devices consisting of a sheet metal stamping formed into a body with an anchoring flange and a locking finger, said body being of tubular configuration forming a socket-receiving opening and an adjacent recess for seating said socket, said flange being arranged for attachment to a panel, and said finger having a pivotal line spaced from the portion of the body defining a wall of the recess and being arranged to be inwardly turned to substantial co-extension with the anchoring flange to grip the socket after the latter is assembled in said body.

WARREN K. HENNING.